(12) United States Patent
Mower et al.

(10) Patent No.: US 8,880,659 B2
(45) Date of Patent: Nov. 4, 2014

(54) CONFIGURING NETWORK DEVICES USING COMPILATIONS OF COHERENT SUBSECTIONS OF CONFIGURATION SETTINGS

(75) Inventors: Carl S. Mower, Sunnyvale, CA (US); Matthew A. Palmer, Menlo Park, CA (US)

(73) Assignee: Aerohive Networks, Inc., Sunnyvale, CA (US)

(*) Notice: Subject to any disclaimer, the term of this patent is extended or adjusted under 35 U.S.C. 154(b) by 176 days.

(21) Appl. No.: 13/528,637

(22) Filed: Jun. 20, 2012
(Under 37 CFR 1.47)

(65) Prior Publication Data
US 2013/0339495 A1 Dec. 19, 2013

Related U.S. Application Data

(63) Continuation-in-part of application No. 12/357,384, filed on Jan. 21, 2009, now Pat. No. 8,259,616.

(60) Provisional application No. 61/021,885, filed on Jan. 17, 2008.

(51) Int. Cl.
*G06F 15/177* (2006.01)
*H04L 12/24* (2006.01)

(52) U.S. Cl.
CPC ............ *H04L 41/0803* (2013.01); *H04L 41/12* (2013.01); *H04L 41/0843* (2013.01); *H04L 41/0813* (2013.01)
USPC .......................................... 709/220; 709/221

(58) Field of Classification Search
CPC .................................................. H04L 41/0893

USPC .................................................. 709/220, 221
See application file for complete search history.

(56) References Cited

U.S. PATENT DOCUMENTS

| | | | |
|---|---|---|---|
| 5,832,503 A | 11/1998 | Malik et al. | |
| 5,872,928 A * | 2/1999 | Lewis et al. | 709/222 |
| 6,011,910 A | 1/2000 | Chau et al. | |
| 6,799,272 B1 | 9/2004 | Urata | |
| 7,131,141 B1 | 10/2006 | Blewett et al. | |
| 7,207,061 B2 | 4/2007 | Martin | |
| 7,461,158 B2 * | 12/2008 | Rider et al. | 709/229 |
| 7,499,438 B2 | 3/2009 | Hinman et al. | |
| 7,546,632 B2 | 6/2009 | Stieglitz et al. | |
| 7,751,392 B1 | 7/2010 | Gonzalez et al. | |
| 7,865,557 B2 | 1/2011 | Tomkow | |
| 7,865,577 B1 | 1/2011 | O'Neil et al. | |
| 7,865,727 B2 | 1/2011 | Zeng et al. | |
| 8,259,616 B2 * | 9/2012 | Mower et al. | 370/254 |
| 8,447,843 B2 | 5/2013 | Johnson et al. | |
| 2002/0138443 A1 | 9/2002 | Schran et al. | |
| 2002/0194369 A1 | 12/2002 | Rawlins et al. | |
| 2003/0009689 A1 | 1/2003 | Kolb | |
| 2003/0048750 A1 | 3/2003 | Kobayashi | |

(Continued)

*Primary Examiner* — Yves Dalencourt
(74) *Attorney, Agent, or Firm* — Sheppard, Mullin, Richter & Hampton LLP

(57) ABSTRACT

A method of configuring a networking device comprises: collecting data regarding the networking device; conveying the data to a remote server; selecting configuration slice instances based on the data using the server, wherein templates for the slice instances are stored on the server; compiling the configuration slice instances using the server; and delivering the compiled configuration slice instances to the networking device; wherein the slice instances are coherent sub-sections of configuration settings for the networking device.

15 Claims, 5 Drawing Sheets

(56) References Cited

U.S. PATENT DOCUMENTS

| | | |
|---|---|---|
| 2003/0055935 A1 | 3/2003 | Tarrant et al. |
| 2003/0074429 A1 | 4/2003 | Gieseke et al. |
| 2003/0117951 A1 | 6/2003 | Wiebe et al. |
| 2003/0120624 A1 | 6/2003 | Poppenga et al. |
| 2003/0212775 A1 | 11/2003 | Steele et al. |
| 2003/0212908 A1 | 11/2003 | Piesco |
| 2004/0098472 A1 | 5/2004 | Styles et al. |
| 2004/0205201 A1 | 10/2004 | Katsube et al. |
| 2004/0233234 A1 | 11/2004 | Chaudhry |
| 2005/0192969 A1 | 9/2005 | Haga et al. |
| 2005/0246346 A1 | 11/2005 | Gerdes et al. |
| 2006/0167988 A1 | 7/2006 | Barck et al. |
| 2006/0200856 A1 | 9/2006 | Salowey et al. |
| 2006/0236093 A1 | 10/2006 | Brok et al. |
| 2007/0014248 A1 | 1/2007 | Fowlow et al. |
| 2007/0043860 A1 | 2/2007 | Pabari |
| 2007/0136804 A1 | 6/2007 | Ohsawa et al. |
| 2007/0274285 A1 | 11/2007 | Werber et al. |
| 2008/0002823 A1 | 1/2008 | Fama et al. |
| 2008/0043627 A1 | 2/2008 | Singh et al. |
| 2008/0046995 A1 | 2/2008 | Satterlee et al. |
| 2009/0052338 A1 | 2/2009 | Kelley et al. |
| 2009/0112734 A1 | 4/2009 | Viehmann et al. |
| 2009/0164579 A1 | 6/2009 | Chaudhry |
| 2009/0276530 A1 | 11/2009 | Gentry et al. |
| 2009/0296604 A1 | 12/2009 | Karaoguz et al. |
| 2009/0327398 A1 | 12/2009 | Campbell et al. |
| 2010/0218104 A1 | 8/2010 | Lewis |

* cited by examiner

CONFIGURING NETWORK DEVICES USING COMPILATIONS OF COHERENT SUBSECTIONS OF CONFIGURATION SETTINGS

CROSS-REFERENCE TO RELATED APPLICATIONS

This application is a continuation-in-part of U.S. patent application Ser. No. 12/357,384, filed Jan. 21, 2009 now U.S. Pat. No. 8,259,616 entitled Decomposition of Networking Device Configuration Into Versioned Pieces Each Conditionally Applied Depending on External Circumstances, which claims the benefit of U.S. provisional application Ser. No. 61/021,885, filed Jan. 17, 2008, all of which are incorporated by reference herein and their entireties.

BACKGROUND

Configuration of networking devices is complex. This task is made even more complicated because configuration settings are typically a function of a network environment of a particular networking device. Today, the environment is appraised by a "network administrator" and a configuration is custom-built for that particular device. Unfortunately, any lessons learned from a single particular device are today not easy to apply to other devices that share the network environment; this is a side-effect of many pieces of today's configurations being "copy-and-pasted" from other devices.

Most networking device configurations today are built device-by-device, "full custom", which is a time-consuming process. Even when that process has been completed, changes to be propagated across many devices require each device's configuration be individually modified.

Today's configuration management often includes "home-grown" scripts that assemble fractions of device configurations in unique combinations for each device according to a device's unique environment, as guided by a static rarely-changing input file describing those device contexts.

Today's solutions have no ability to adapt to the quickly changing environment of each device. There is a need for more efficient ways for configuring devices in a network.

SUMMARY

Rather than specifying a particular networking device's settings as one monolithic whole, according to embodiments of the present invention the settings are described as the union of a collection of configuration slices. The slices, which are portions of a full configuration for one networking device, are stored centrally, on a server. The different instances of each type of slice are combined at the server to make a full configuration for each networking device, and are then conveyed to each networking device. Each slice can still be updated, but all devices that reference that slice will then use the newest version of that slice. In this manner, a change to the slice instance is reflected across all devices for which that slice instance is appropriate.

According to aspects of the invention a method of configuring a networking device comprises: collecting data regarding the networking device; conveying the data to a remote server; selecting configuration slice instances based on the data using the server, wherein templates for the slice instances are stored on the server; compiling the configuration slice instances using the server; and delivering the compiled configuration slice instances to the networking device; wherein the slice instances are coherent subsections of configuration settings for the networking device.

DETAILED DESCRIPTION

Figure 1:
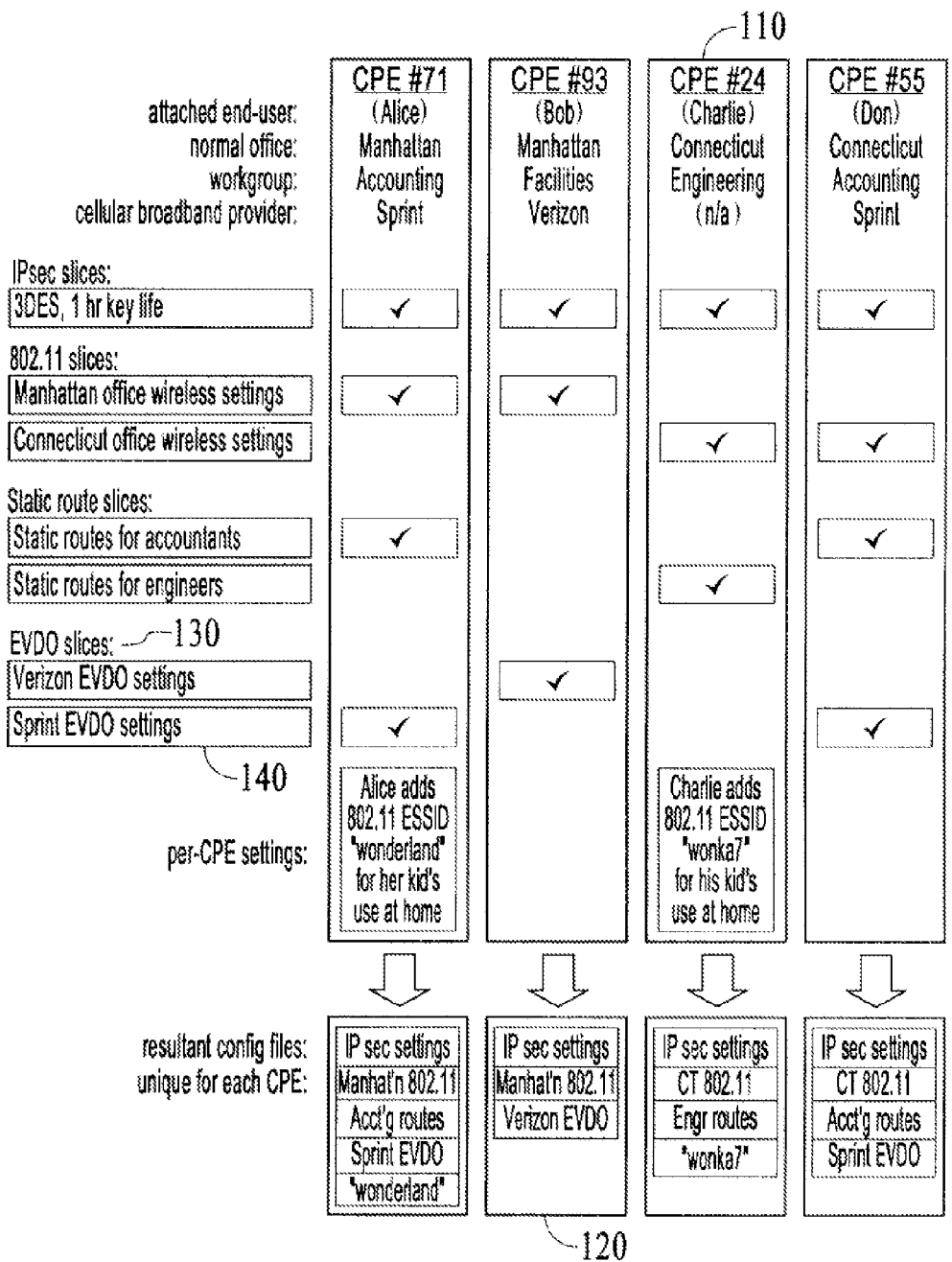
FIG. 1 shows an illustration of total device configuration comprising coherent sub-sections of configuration settings—"slices"—according to embodiments of the invention.

FIG. 1 shows an example of configurations 110 for four different networking devices—CPE #s 24, 55, 71 and 93. Each networking device provides networking services for a different end-user, with identified home office, workgroup and cellular broadband provider. The configurations are shown in the vertical columns, and a resultant configuration file 120, unique to each networking device, is also shown. The configurations are shown to be comprised of a number of slices 130—details of the slices for each networking device being shown in rows. Each slice has slice instances 140— particular settings which are network environment dependent. These slice instances consist of fractions of device configuration sufficient to express a single coherent fraction of a device's total configuration. The particular example shown in FIG. 1 shows some fraction of device configuration is common across all devices shown—the "IPsec" slice.

IPsec is an end-to-end security scheme operating in the Internet Layer of the Internet Protocol Suite. It can be used, for example, to protect data flows between a pair of hosts (host-to-host), between a pair of security gateways (network-to-network), or between a security gateway and a host (network-to-host). Some other Internet security systems in widespread use, such as Secure Sockets Layer (SSL), Transport Layer Security (TLS) and Secure Shell (SSH), operate in the upper layers of the TCP/IP model.

IPsec includes authentication headers (AH) to provide connectionless integrity and data origin authentication for IP datagrams and protect against replay attacks. In IPv4, the AH protects IP payload and header fields of an IP datagram except for mutable fields, and IP options. Mutable IPv4 header fields include DSCP/TOS, ECN, Flags, Fragment Offset, TTL and Header Checksum. In IPv6, the AH protects most of the IPv6 base header, AH itself, non-mutable extension headers after the AH, and IP payload. Protection for the IPv6 header excludes the mutable fields: DSCP, ECN, Flow Label, and Hop Limit.

IPsec includes encapsulating security payloads (ESP) to provide confidentiality, data-origin authentication, connectionless integrity, anti-replay service, and limited traffic-flow confidentiality. ESP also supports encryption-only and authentication-only configurations, but using encryption without authentication is strongly discouraged because it is insecure. Unlike AH, ESP in transport mode does not provide integrity and authentication for the entire IP packet. However, in Tunnel Mode, where the entire original IP packet is encapsulated, ESP protection is afforded to the whole inner IP packet (including the inner header) while the outer header (including any outer IPv4 options or IPv6 extension headers) remains unprotected.

Security associations (SA) include a bundle of algorithms and parameters (such as keys) to encrypt and authenticate flows. In normal bi-directional traffic, the flows are secured by a pair of SA. The Internet security association and key management protocol (ISAKMP) provides a framework for authentication and key exchange, with actual authenticated keying material provided either by manual configuration with pre-shared keys, Internet key exchange (IKE), Kerberized Internet negotiation of keys (KINK), or IPSECKEY DNS records. In order to decide what protection is to be provided for an outgoing packet, IPsec uses a security parameter index (SPI), an index to a security association database (SADB), along with a destination address in a packet header, which together uniquely identify a security association for that packet. A similar procedure is performed for an incoming packet, where IPsec gathers decryption and verification keys from the security association database. For multicast, a security association is provided for the group, and is duplicated across all authorized receivers of the group. There may be more than one security association for a group, using different SPIs, thereby allowing multiple levels and sets of security within a group. Each sender can have multiple security associations, allowing authentication, since a receiver can only know that someone knowing the keys sent the data.

IPsec can be implemented in a host-to-host transport mode, as well as in a network tunnel mode. In transport mode, packet payload is usually encrypted and/or authenticated and routing is intact because the IP header is neither modified nor encrypted. Transport mode is used for host-to-host communications. In tunnel mode, the entire packet is encrypted and/or authenticated. It is then encapsulated into a new packet with a new header. Tunnel mode is used to create virtual private networks (VPNs) for network-to-network communications (e.g. between routers to link sites), host-to-network communications (e.g. remote user access), and host-to-host communications (e.g. private chat).

Referring once again to the example of FIG. 1, in the case of 802.11 wireless settings, some devices receive the Manhattan settings while other devices receive the Connecticut settings, based on the workplace the associated user is based from—this is an example of slices being applied on the basis of the geographic location of the target devices. A different criteria under which a portion of the networking device configuration may be applied is the role of the human agent which the networking device services. In the figure, there are different "static route" slices for accountants and engineers. Yet another basis for deciding which networking devices receive which instances of a type of slice is a function of the attributes of the networking device itself. In FIG. 1, some devices are equipped with Sprint 3G cards while others are equipped with Verizon 3G cards.

The very heart of the configuration of customer premise equipment (CPE) and Hubs, referred to herein as "devices", is the way network management—the act of administering a collection of networking devices—handles the slices of configuration that eventually make-up the actual configuration file for each device. The slices, which are portions of a full configuration for one networking device, are stored centrally, perhaps on a server. The different instances of each type of slice are combined to make a full configuration for each networking device, and are then conveyed to each networking device. The "authoritative" copy remains at the central location (a remote server). In order to properly assemble the appropriate slices for each device, information about each device must be maintained on that central store of slices—for example, from FIG. 1, attributes of each device must be known. Rather than specifying a particular networking device's settings as one monolithic whole, according to embodiments of the present invention the settings are described as the union of a collection of configuration slices. Each slice can still be updated, but all devices that reference that slice will then use the newest version of that slice. In this manner, a change to the slice instance is reflected across all devices for which that slice instance is appropriate. The actual method of conveying the resultant, full configuration for a particular device to the actual networking device may include heartbeating, for example. Each slice is version controlled. That is, every single edit of a slice (beginning with its creation) causes a new version to be created. Users can generate differences from one slice version to another to see what has changed. Some users may have permission to edit a slice, thus making a new version of that slice, but may not have permission to deploy that version of the slice to the devices until someone else approves the change (maybe using a difference function to quickly see the proposed changes).

Networking devices may self-select the slice appropriate to their particular environment, as a function of that device's: attributes—presence/absence of an EVDO (telecommunications standard for wireless communications) card, for example; local network surroundings—speed of the wide area network (WAN) link, for example; or perhaps the role of the human end-users which the networking device services. Alternatively, which slices should be used by a particular networking device may be statically declared, although such determinations maybe performed in "real-time" based on other up-to-the-second inputs. For example, selection of which particular instance of a slice to use may be based on any, all or different combinations of the following criteria: indirectly based on user repository database values fetched for a particular end-user connected to the network device; based on information the end-user provided when they installed the network device; directly based on statically declared groups of devices; and based on auto-detection performed by the networking device. These criteria are described in detail below.

The following is a description of how a networking device is configured, according to embodiments of the invention. Assume a collection of networking devices have been deployed. As part of the deployment of each device, several data-collection processes are initiated. For the actual networking device itself, the device reports on its attributes—for example which line cards are installed, CPU and memory capacity, or network interface speeds. The networking device also automatically detects its surroundings—for example, it measures the speed of its connection to the Internet, or its geographic location. At the time of device installation, the human installer is queried as to the role of the end-user which this device will service. All of these attributes are conveyed to the central management application, on a remote server, which stores these attributes for each device. Also at that central location are templates—the definitions of the types of configuration variables that compose a slice. Networking engineers create specific instances of those templates, the slices, and associate instances with different values for the different attributes. For example, a networking engineer might declare a 802.11 wireless template to consist of ESSID, and a pre-shared key to implement a wireless LAN on a networking device. The template does not contain values for those variables, it merely denotes that such values would exist in any slice instantiated from such a template. The networking engineer would also create instances of that template—for example, one instance for wireless settings for workers based out of the Manhattan office, (perhaps ESSID-"NYC" and key="BigApple"), and a separate instance/slice for workers based out of the Connecticut office, (perhaps ESSID="CT" and key="CtYankee"). Based on an external database that maps end-users serviced by each networking device to the office they are based out of, the system can assign the appropriate slice to each device. Such assignment is made in a compilation step where for each networking device, the appropriate slices are selected and compiled into one full configuration for that networking device; this process is repeated for each networking device. The resultant configurations are then conveyed to the networking devices. Generally, compilation occurs as initiated by the network manager, typically after one or more changes are made to one or more of the slices and/or network devices are added/removed to/from the system. In the latter case, only the added/removed devices need be recompiled.

Slice Instance Selection Indirectly Based on User Repository Database Values Fetched for a Particular End-User Connected to the Network Device Each network device caches the last end-user to successfully authenticate on that networking device. Attributes found in that end-user's repository database record on the server are used to select appropriate configuration slices. User repository databases, such as Active Directory (AD) may be used. Lightweight Directory Access Protocol (LDAP) may be used for querying and modifying repository databases over TCP/IP. For each slice, an exact AD/LDAP attribute is declared to be the "switch" variable. Here a switch variable may be the variable in a switch statement, as used in modern imperative programming languages, such as C. The end-user also specifies all anticipated values AD might return for that variable and which slice to apply when each is encountered. These end-user specified rules could be as simple as a switch statement, as described above, or more complex. A "default" clause should be provided, and if ever used may trigger an alarm to the network manager(s) informing them that their rules need updating.

For example, assume a company would like to broadcast the same 802.11 Extended Service Set Identifier (ESSID) (and associated authorization/encryption) as the end-user finds in their associated "normal" workplace. If the Manhattan and Connecticut offices have different 802.11 settings, the network manager user would create two 802.11 slices and for the template make the rule:

```
Attribute to use for switch: "AD:normal-work-site"
Connecticut:
    <use "Connecticut office wireless settings" slice instance>
Manhattan:
    <use "Manhattan office wireless settings" slice instance>
default:
    <apply no wireless settings & generate alarm>
```

See FIG. 1. The alarm generation is optional, but for many AD values the intent will be to exhaustively specify which slice to use for all possible values; finding an end-user that has a different "normal-work-site" value indicates there is a bug in the rules or in the AD database that should be addressed. Also, there may be a need for a different "default" clause that is executed if a particular piece of customer premise equipment (CPE) has not been licensed to use a particular feature, which otherwise would not yield a slice and an alarm.

Another example of a slice that may be decided using this AD-indirect method is determination of the Network Time Protocol (NTP) time-zone based on the state found in the end-users home-address AD record.

Slice Instance Selection Based on Information the End-User Provided when they Installed the Network Device As part of the initial installation, the end-user could be prompted for the time-zone for that location. The values provided can be saved by network management software and used as switch values for selecting a slice instance.

Additionally, these end-user provided values may be useful as per-device substitution variables. For example, in a NTP template, the time zone may be set to the value the end-user provided. The "time-zone" setting would be something like $-TIMEZONE-PROVIDED-BY-END-USER-$. (Using the end-user provided time zone value as a switch variable wouldn't work quite as well in this case, as that variable would then select among 4-6 US time zone slices, each slice being identical to the others except for the time zone setting). Networking devices need to have their software updated from time-to-time. In a network composed primarily of 9-to-5 office workers, updating the networking device at 2 or 3 am (local time) is probably the hour least likely to impact an end-user trying to get work done. In a geographically diverse network, the devices may be deployed in different time-zones, and so 2 am (local) occurs at different times. In order to implement such a scheme, a slice that specifies that device updates should occur at 2 am local time needs as an input what time zone that device resides in. While it might be possible to infer the timezone via other methods, assume here that the end-user is asked for this information at the time of installation. The answer the end-user provides is stored in the system on a per-device basis. If you had a network that spanned 4 timezones in the USA, you could solve this with 4 slices that are 99% identical, except that each would specify a different UTC time to apply updates, for example 10 am UTC for devices in the West is 2 am local and 7 am UTC for devices in the East is 2 am local. This would be wasteful and confusing as those slices would be identical except for the exact time to apply updates. Instead, the exact time to apply updates is left as a variable in the slice, (say "$-UPDATE-HOUR-$), and the exact value for the slice is filled-in from the value provided by the end-user when they installed the networking device.

Slice Instance Selection Directly Based on Statically Declared Groups of Devices Not every choice of appropriate slice will be covered indirectly by AD values for the attached end-user. For example, it is highly unlikely that AD would know that Bob's backup cellular broadband provider is Verizon while for Alice and Don the provider is Sprint. See FIG. 1.

Figure 2:
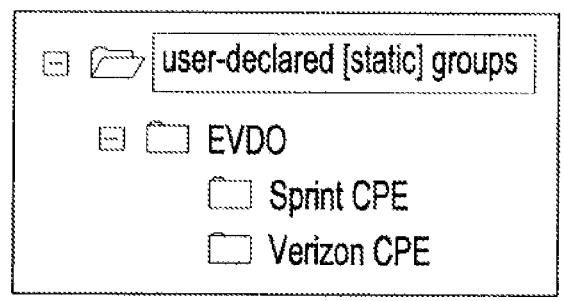
FIG. 2 shows a user repository database configuration, according to embodiments of the invention.

For cases that AD cannot address, the network manager can create "device groups" which are static groupings of CPE that can be used as the condition on which different slices are applied. In order to keep related device-groups together, groups-of-groups may also be permitted. For example, see FIG. 2. In this example, an EVDO template would have a rule that says:

```
Attribute to use for switch: "DEVICE-GROUP: EVDO"
"Sprint CPE": <use "Sprint EVDO settings">
"Verizon CPE": <use "Verizon EVDO settings">
default: <apply no EVDO settings & generate alarm>
```

The default clause should only kick-in if an EVDO card is detected in the network device. When Information Technology issues an EVDO card to an end-user, they also add the end-users' network device to the appropriate group. Because this method of determining the appropriate slice is errorprone and labor intensive, it generally should be used when other methods are unavailable.

Slice Instance Selection Based on Auto-Detection Performed by the Networking Device An alternative approach to slice determination for the above example with the EVDO card may be for the networking device to auto-sense the type of EVDO card and make the card type a switch variable for slice determination.

There may be other things the networking device can auto-detect that would be useful. For example, by determining the domain name system (DNS) prefix of the nearest far-end router (NFER), the networking device may be able to distinguish the provider of the WAN link (An NFER is the first router encountered on a WAN link, a link connecting a networking device to the Internet, on the "far" side of the WAN link For example, a home-user often is connected to the Internet via a DSL or Cable modem. The first router encountered on the "far end" of the DSL/cable link is the NFER. A heuristic for automatically detecting the NFER would be to perform a traceroute to a variety of Internet destinations—the farthest-away router that is common to all the resulting paths is the NFER.) For example, given that the NFER on a user's PC is "bras23-10.pltnca.sbcglobal.net", the WAN link provider is clearly SBC. One way such information automatically detected by the networking device could be used would be to deliver a different user agreement or policy to the networking device in the event the user's provider changes from its last known value and/or force the end-user to go through the installation procedure again. This will be useful when the end-user either moves or takes the networking device on vacation with them.

Figure 3:
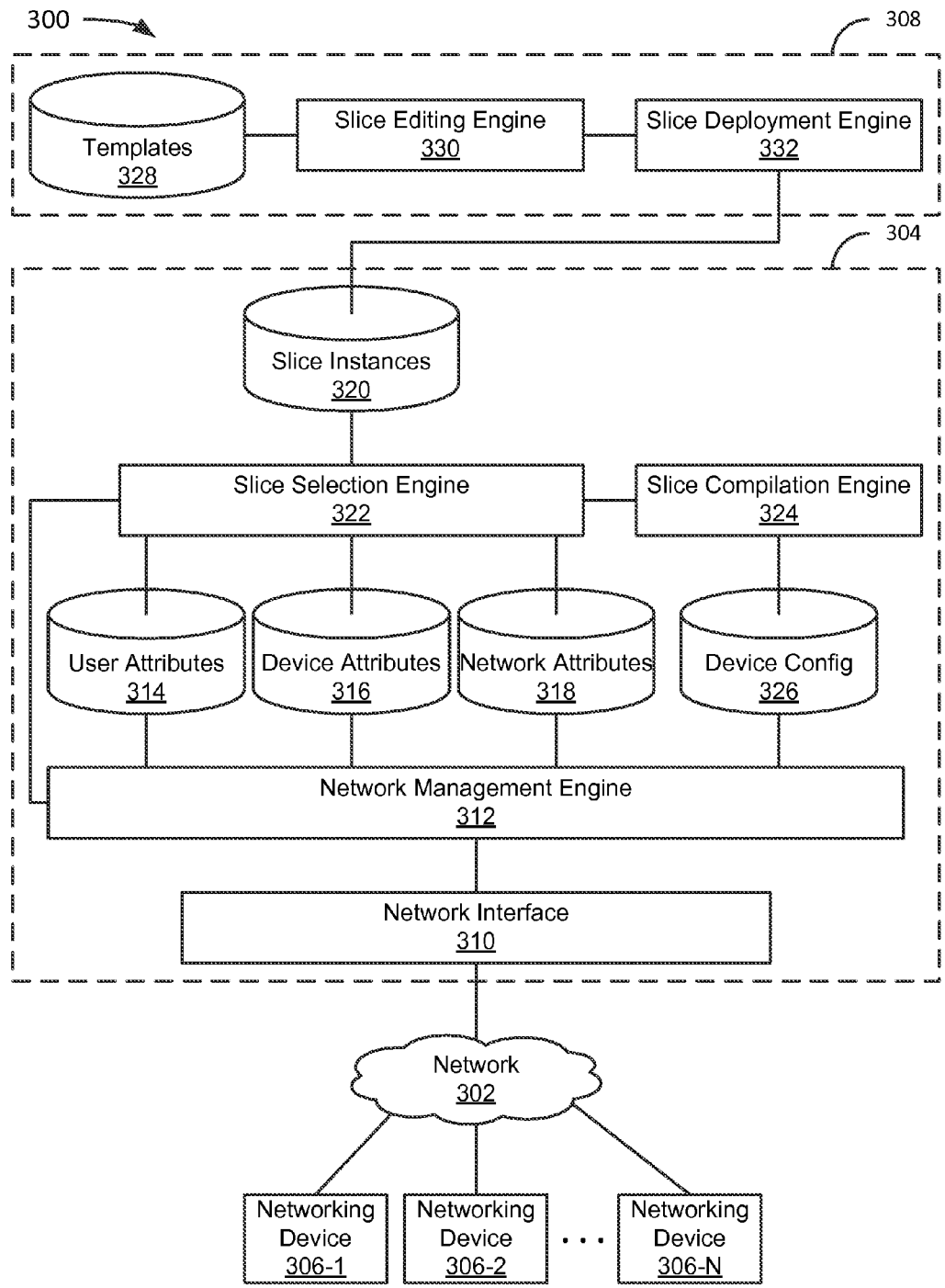
FIG. 3 depicts a diagram of an example of a system for unique on-the-fly configuration of networking devices.

FIG. 3 depicts a diagram 300 of an example of a system for unique on-the-fly configuration of networking devices. In the example of FIG. 3, the diagram 300 includes a network 302, a server 304, networking devices 306-1 to 306-N (collectively, networking devices 306), and a configuration slice instance server 308.

In the example of FIG. 3, the network 302 may be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 302 can include, for example, a wide area network (WAN), metropolitan area network (MAN), campus area network (CAN), or local area network (LAN), but the network 302 could at least theoretically be of any size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 3 is intended to illustrate a network 302 that may or may not include more than one private network.

In the example of FIG. 3, the server 304 is coupled to the network 302. The server 304, and more generally any device connected to a network, can be referred to as "on" the network. For illustrative purposes, the server 304 is described in this example as managing network devices. Accordingly, in this example, the server 304 can be referred to as a network management server. Unless context dictates otherwise, a server as used in this paper includes at least a portion of a computer system running server software.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 3, the server 304 includes a network interface 310, a network management engine 312, a user attributes datastore 314, a device attributes datastore 316, a network attributes datastore 318, a slice instances datastore 320, a slice selection engine 322, a slice compilation engine 324, and a device configuration datastore 326. The network interface 310 can include an access point (AP) or some other wired or wireless interface to the network 302.

The network management engine 312 is coupled to the network interface 310. In a specific implementation, the network management engine 312 controls configuration of the networking devices 306. Controlling configuration can include receiving information from the networking devices 306 in order to determine an appropriate configuration for one or more of the networking devices 306, or from other sources.

The user attributes datastore 314 is coupled to the network management engine 312. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The user attributes datastore 314 includes data associated with a user, such as the user's role in an enterprise (e.g., accountant, engineer, etc.). This data may or may not be received from one of the networking devices 306. In a specific implementation, the user attributes datastore 314 includes data about a user that is stored as part of a user's profile, and which becomes applicable in a given networking device configuration context when a networking device provides data sufficient to identify a user of the networking device as one of the users represented in the user attributes datastore 314. A representation of a user in the user attributes datastore 314 can be referred to as a user profile.

The device attributes datastore 316 is coupled to the network management engine 312. The device attributes datastore 316 includes data associated with a networking device, such as hardware or software capabilities, settings, etc. This data may or may not be received from one of the networking devices 306. In a specific implementation, the device attributes datastore 316 stores data the network management engine 312 collects from one of the networking devices 306. A representation of a networking device in the device attributes datastore 316 can be referred to as a device profile.

The network attributes datastore 318 is coupled to the network management engine 312. The network attributes datastore 318 includes data associated with a network, such as physical location, BSSID, ESSID, virtual LAN (VLAN), congestion, etc. This data may or may not be received from one of the networking devices 306. In a specific implementation, the network attributes datastore 318 stores data an administrator entered using a network management application implemented in the network management engine 312 about one or more networks managed by the administrator. A representation of a network in the network attributes datastore 318 can be referred to as a network profile.

The slice instances datastore 320 is coupled to the configuration slice instance server 308, the functionality of which is described later. The slice instances datastore 320 includes data associated with networking device configurations. This data is organized as coherent subsections of configuration settings, which are referred to as "slices" in this paper. Conceptually, each slice can have multiple instances, which are stored in the slice instances datastore 320. For example, a device's total configuration may consist of coherent subsections of configuration settings such as settings related to the device's 802.11 wireless operation. Across a population of networking devices, there may be several sets of configuration settings that are appropriate, each slightly different from the others depending on the network environment of the particular networking device. For example, there could be an 802.11 configuration slice that describes the wireless settings sufficient to match the wireless environment found in the Manhattan office, and another slice that describes the characteristics of the Connecticut office. See FIG. 1. These two slices are identical in the types of configuration values they contain, but at least some values will differ. Each particular set of settings is the "slice instance". Such slice instances may also vary across time, as they evolve over the course of weeks or months. Therefore, such slice instances may also be versioned.

The slice selection engine 322 is coupled to the user attributes datastore 314, the device attributes datastore 316, the network attributes datastore 318, and the slice instances datastore 320. The slice selection engine 322 can use the data in the user attributes datastore 314, the device attributes datastore 316, and the network attributes datastore 318 to determine which slice instances in the slice instances datastore 320 are applicable to a particular one of the networking devices

306. For example, the slice selection can identify a network profile, user profile, and device profile applicable to a given networking device and choose an IPsec slice (which, for illustrative purposes, is the same for each the networking devices 306), an 802.11 slice based upon the network profile, a static route slice based upon the user profile, an EVDO slice based upon the device profile, and a per-CPE settings slice based upon one or more of the profiles.

The slice compilation engine 324 is coupled to the slice selection engine 322. The slice compilation engine 324 combines the slices selected by the slice selection engine 322 into a full configuration for the applicable networking device.

The device configuration datastore 326 is coupled to the slice compilation engine 324 and the network management engine 312. The device configuration datastore 326 stores the full configuration for the networking devices 306. The network management engine 312 can provide the applicable unique full configuration for each of the networking devices 306 when needed. Configuration may be needed when a networking device is authenticated, when a new version of a slice becomes available, or in other instances where a given networking device does not or is not expected to have its proper up-to-date network configuration settings.

In the example of FIG. 3, the configuration slice instance server 308 includes a templates datastore 328, a slice editing engine 330, and a slice deployment engine 332. The configuration slice instance server 308 can be implemented on a device or distributed across devices that are separated from the server 304 by a network, or the server 304 and the configuration slice instance server 308 can be implemented on the same device or distributed across the same devices.

The templates datastore 328 includes data structures that include a portion of a configuration that controls admin- or user-configurable aspects of that portion of the configuration. In a specific implementation, templates include empty parameters, or variable data fields, that can be given a value when the template is converted to an instance. For example, in the 802.11 template, there exists an Extended Service Set Identifier (ESSID) setting for which a value will be requested. Templates can be created by, for example, a networking engineer skilled in network management, an applicable expert system, or the like. In a specific implementation, templates cannot be edited by users.

The slice editing engine 330 is coupled to the templates datastore 328. The slice editing engine 330 can fill in values for a template to create a slice instance. A slice instance can be defined as a copy of a template with actual values filled-in for one or more (and perhaps all) parameters. For a given 802.11 template, there can be multiple 802.11 slices instances. See FIG. 1. A slice instance can be versioned. In a specific implementation, versioning includes keeping a record of each version of a slice instance, including what was changed and who made the change.

The slice deployment engine 332 is coupled to the slice editing engine 330. Depending upon the implementation, it may be desirable to have an explicit command for deployment of new slice instances or versions of slice instances. The slice deployment engine 332 provides a new slice or new version of a slice instance to the slice instances datastore 320. It may be noted that a master slice instances datastore can be local to the slice deployment engine 332, while the slice instances datastore 320 is a subset of the master slice instances datastore. (Presumably the subset that is relevant to the network 302.)

In the example of FIG. 3, the server 304 provides network access to the networking devices 306. In this example, the server-client relationship between the server 304 and the networking devices 306 is that of network server to network clients. The networking device 306-1 can include a client of some other server or include a server for some other client. For example, in a wireless context, the device can include a wireless client and be associated with a wireless network, such as a wireless LAN (WLAN).

In a wireless communications context, the networking devices 306 can be referred to as stations. A station, as used in this paper, may be referred to as a device with a media access control (MAC) address and a physical layer (PHY) interface to a wireless medium that complies with the IEEE 802.11 standard. Thus, for example, the networking devices 306 and a wireless access point (WAP) with which the stations 106 associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

Input into the methods described herein come from the human agent interacting with the network management application (for example to apply certain settings to some devices and not others), or from databases on other servers at other locations (for example a database that captures reporting structures for the target company), or from information collected by the networking devices (for example the capabilities of that networking hardware or information about the networks surrounding that networking device).

Figure 4:
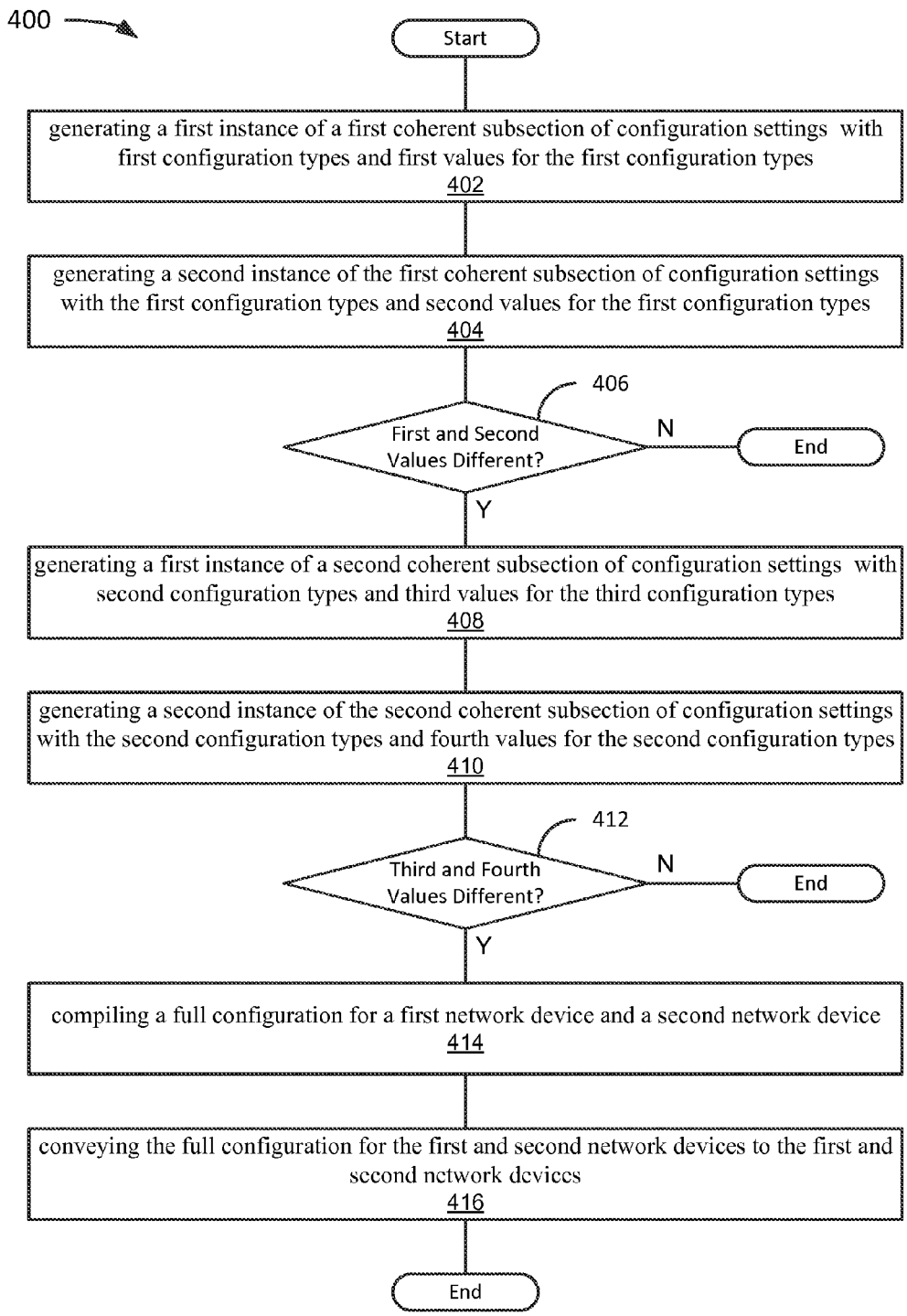
FIG. 4 depicts a flowchart of an example of a method for unique on-the-fly configuration of networking devices.

FIG. 4 depicts a flowchart 400 of an example of a method for unique on-the-fly configuration of networking devices. This flowchart and other flowcharts are depicted in the figures of this paper as serially arranged modules. However, modules of the flowcharts may be reordered or arranged for parallel execution as appropriate.

In the example of FIG. 4, the flowchart 400 starts at module 402 with generating a first instance of a first coherent subsection of configuration settings with first configuration types and first values for the first configuration types. The first configuration types include a first configuration type. The first values include a first value.

In the example of FIG. 4, the flowchart 400 continues to module 404 with generating a second instance of the first coherent subsection of configuration settings with the first configuration types and second values for the first configuration types. The second values include a second value.

In the example of FIG. 4, the flowchart 400 continues to decision point 406 with determining whether the first and second values are different. If it is determined that the first and second values are not different (406-N), then the flowchart 400 ends. If, on the other hand, it is determined that the first and second values are different, then the flowchart 400 continues to module 408. The decision point 406 conceptually ensures that the first value for the first configuration type is different from the second value for the first configuration type.

In the example of FIG. 4, the flowchart 400 continues to module 408 with generating a first instance of a second coherent subsection of configuration settings with second configuration types and third values for the third configuration types. The second configuration types include a second configuration type. The third values include a third value.

In the example of FIG. 4, the flowchart 400 continues to module 410 with generating a second instance of the second coherent subsection of configuration settings with the second configuration types and fourth values for the second configuration types. The fourth values include a fourth value.

In the example of FIG. 4, the flowchart 400 continues to decision point 412 with determining whether the third and fourth values are different. If it is determined that the third and fourth values are not different (412-N), then the flowchart 400 ends. If, on the other hand, it is determined that the third and fourth values are different, then the flowchart 400 continues to module 414. The decision point 412 conceptually ensures that the third value for the second configuration type is different from the fourth value for the second configuration type.

In the example of FIG. 4, the flowchart 400 continues to module 414 with compiling a full configuration for a first network device and a second network device. The compilation can occur at a network server on which the first and second network devices are clients or some other (data) server. The full configuration for the first network device includes the first instance of the first versioned device configuration slice and the first instance of the second versioned device configuration slice. The full configuration for the second network device includes the second instance of the first versioned device configuration slice and the second instance of the second versioned device configuration slice.

In the example of FIG. 4, the flowchart 400 ends module 416 with conveying the full configuration for the first and second network devices to the first and second network devices. In this way, the first network device can have a first configuration and the second network device can have a second configuration that is different than that of the first configuration.

Figure 5:
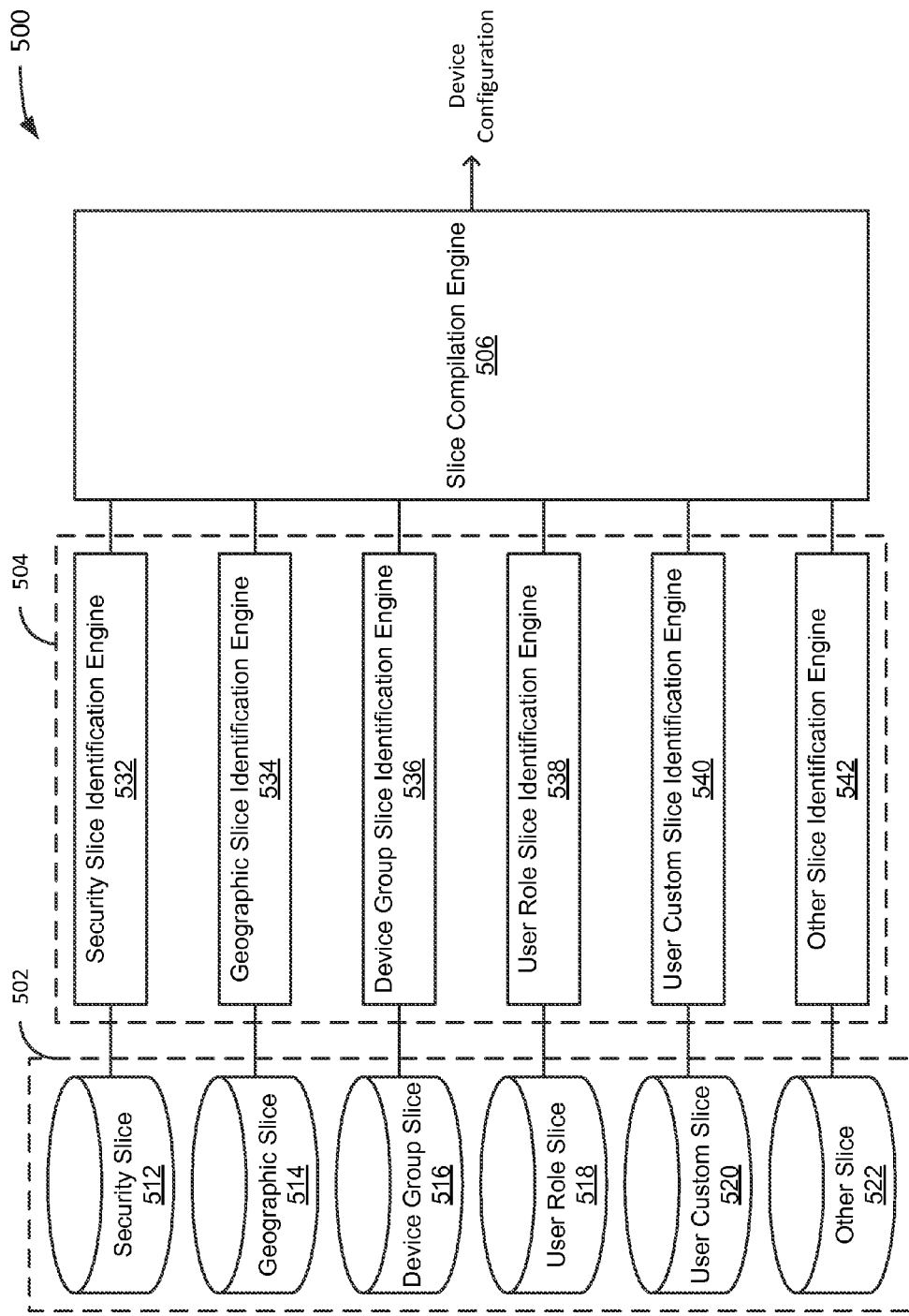
FIG. 5 depicts a diagram of an example of a device configuration system that compiles coherent subsections of configuration settings.

FIG. 5 depicts a diagram 500 of an example of a device configuration system that compiles coherent subsections of configuration settings. The diagram 500 includes a slice instances datastore 502, a slice selection engine 504, a slice compilation engine 506, and a device configuration datastore 508.

In the example of FIG. 5, the slice instances datastore 502 includes a security slice datastore 512, a geographic slice datastore 514, a device group datastore 516, a user role slice datastore 518, a user custom slice datastore 520, and an "other" slice datastore 522. In a specific implementation, the slice instances datastore 502 is the same as or similar to the slice instances datastore 320 in the example of FIG. 3.

The security slice datastore 512 includes a coherent subsection of configuration settings associated with network security. In a specific implementation, there is only one security slice in the security slice datastore 512, which is applied to all applicable devices in a network. Alternatively the security slice datastore 512 can include multiple versions of a single security slice. Alternatively, the security slice datastore 512 can include multiple security slices (including one or more versions of each, if applicable), of which only one of the security slices is active. In a specific implementation, IPsec is used for network security. In this implementation, a security slice of the security slice datastore 512 can be referred to as an IPsec slice. IPsec is an open standard protocol suite for securing IP communications by authenticating and encrypting IP packets of a communication session. IPsec also includes protocols for establishing mutual authentication between agents at the beginning of a session and negotiating cryptographic keys to be used during the session.

The geographic slice datastore 514 includes a coherent subsection of configuration settings associated with a geographic location of a network. For example, a user located in a specific office, such as "the Manhattan office," can be assigned an office slice associated with the Manhattan office. To facilitate this functionality, each geographic location (e.g., each LAN of an enterprise) can have an associated slice. Depending upon the implementation, a subset of the geographic slices in the geographic slice datastore 514 could be the same.

The device group slice datastore 516 includes a coherent subsection of configuration settings associated with device-specific characteristics. In a specific implementation, a device group comprises devices that can be identified as having particular device characteristics, such as EVDO capabilities. In this example, one slice could be appropriate for a device with Verizon EVDO settings and another slice could be appropriate for a device with Sprint EVDO settings. In a specific implementation, a device group can include other device groups.

The user role slice datastore 518 includes a coherent subsection of configuration settings associated with a user's role in an enterprise. The role of a user can be a profession, such as accountant, engineer, or some other job; rank in a company hierarchy, such as CXO, foreman, or some other rank; current grouping, which can be dynamically adjusted depending upon changing work conditions (e.g., an engineer working on a specific project could be given a particular role slice for the duration of the engineer's participation in the specific project). In a specific implementation, a user can have multiple roles.

The user custom slice datastore 520 includes a coherent subsection of configuration settings associated with a user's selectable options. For example, the user can add 802.11 ESSID "wonderland" for the user's kid's use at home.

The other slice datastore 522 includes a coherent subsection of configuration settings intended to act as a catch-all for implementation of other slices in an enterprise. For example, a VLAN slice might include slices for VLANs (e.g., associated with a user's home office). Conceptually, the geographic slice is where a user is currently located (whether home or away) and the VLAN slice is associated with the user's home office, an office that hosts the VLAN, or some other office. The VLAN slice could be stored in a distinct datastore, such as a VLAN datastore (not shown) or the VLAN slice could be considered part of the user's "role" in an enterprise. Thus, in one implementation, the VLAN of a user can address both, e.g., the home office and role of the user in a single slice. Alternatively, the VLAN and role can be associated with distinct slices.

In the example of FIG. 5, the slice selection engine 504 includes a security slice identification engine 532, a geographic slice identification engine 534, a device group slice identification engine 536, a user role slice identification engine 538, a user custom slice identification engine 540, and an "other" slice identification engine 542. In a specific implementation, the slice instances selection engine 504 is the same as or similar to the slice instances selection engine 322 in the example of FIG. 3.

The security slice identification engine 532 is coupled to the security slice datastore 512. In a specific implementation, the security slice datastore 512 includes one valid security slice that is for use by all applicable network devices. Accordingly, the security slice identification engine 532 may or may not actually have to make a choice.

The geographic slice identification engine 534 is coupled to the office slice datastore 514. The geographic slice identification engine 534 can choose a geographic slice that corresponds to a user's geographic location. In a specific implementation, the geographic slice can be consistently the same for a given LAN because the LAN is located in a constant geographic location. Where it is desirable to refer to a specific one of multiple LANs in a given geographic location, the geographic slices can be broken down by geographic location and LAN. Such a break-down enables one to refer to each of multiple overlapping LANs—particularly WLANs because they so frequently overlap with one another and a wired LAN—in the same geographic location. So the geographic slice identification engine 534 can select an appropriate slice for an office, or know the appropriate slice for the office, in advance of a user being authenticated on the network.

The device group slice identification engine 536 is coupled to the device group slice datastore 516. When a network device falls in more than one device group, resulting in multiple variable instantiations for a single variable, the conflict can be resolved in a common-sense manner (e.g., based upon which group is superior from a network services perspective). In some cases, it may be possible to merge some variable instantiations into one, depending upon implementation- and configuration-specific factors, as well as the nature of the variable.

The user role slice identification engine 538 is coupled to the user role slice datastore 518. When a user has more than one role, resulting in multiple instantiations for a single variable, the conflict can be resolved in a common-sense manner (e.g., based upon which role is superior from a network services perspective). In some cases, it may be possible to merge some variable instantiations into one, depending upon implementation- and configuration-specific factors, as well as the nature of the variable. In a specific implementation, the network management engine can ask a user to specify which role is appropriate. In a specific implementation, a user can be relegated to a single role per credentials set, forcing a user to use appropriate credentials during an authentication process in order to be associated with a particular role.

The user custom slice identification engine 540 is coupled to the user custom slice datastore 520. These three engines likely cannot select an appropriate slice until after an association with a network is initiated. Then the engines 536, 538, 540 can identify appropriate slices using device parameters, user role, and user customization choices.

The other slice identification engine 542 is coupled to the other slice datastore 522. This is intended to be a catch-all category. Accordingly, when data sufficient to enable the other slice identification engine 542 to know what slice is appropriate will depend upon the implementation- and/or configuration-related factors.

The slice compilation engine 506 is coupled to each of the identification engines 532-542 of the slice selection engine 504. The slice complication engine 506 can be similar to the slice compilation engine 324 of the example of FIG. 3. The slice compilation engine 506 assembles the slices from each of the relevant identification engines 532, 542 into a device configuration for use by the system in configuration network devices.

What is claimed is:

1. A system comprising:
    a slice instances datastore configured to store coherent subsections of network device configuration settings, each coherent subsection of network device configuration settings being sufficient to express a coherent fraction of a larger network device configuration;
    a slice selection engine, coupled to the slice instances datastore, comprising a plurality of slice identification engines configured to identify a plurality of the coherent subsections of network device configuration settings;
    a slice compilation engine, coupled to the slice selection engine, configured to assemble the plurality of the coherent subsections of network device configuration settings identified by the slice identification engines into a combined set of configuration settings for a network device.

2. The system of claim 1, wherein:
the slice instances datastore includes a security slice datastore;
the plurality of slice identification engines include a security slice identification engine coupled to the security slice datastore, wherein, in operation, the security slice identification engine identifies a security slice that is valid for the network device, the security slice being sufficient to express a coherent fraction of a larger security-related configuration.

3. The system of claim 1, wherein:
the slice instances datastore includes a geographic slice datastore;
the plurality of slice identification engines include a geographic slice identification engine coupled to the geographic slice datastore, wherein, in operation, the geographic slice identification engine identifies a geographic slice that matches a geographic location of the network device, the geographic slice being sufficient to express a coherent fraction of a larger geography-related configuration.

4. The system of claim 1, wherein:
the slice instances datastore includes a geographic slice datastore;
the plurality of slice identification engines include a geographic slice identification engine coupled to the geographic slice datastore, wherein, in operation, the geographic slice identification engine identifies a geographic slice that matches a LAN associated with an authentication of the network device, the geographic slice being sufficient to express a coherent fraction of a larger geography-related configuration.

5. The system of claim 1, wherein:
the slice instances datastore includes a device group slice datastore;
the plurality of slice identification engines include a device group slice identification engine coupled to the device group slice datastore, wherein, in operation, the device group slice identification engine identifies a device group slice that matches a device parameter of the network device, the device group slice being sufficient to express a coherent fraction of a larger device group-related configuration.

6. The system of claim 1, wherein:
the slice instances datastore includes a device group slice datastore;
the plurality of slice identification engines include a device group slice identification engine coupled to the device group slice datastore;
wherein, in operation:
    the device group slice identification engine identifies multiple device group slices that match a device parameter of the network device, each device group slice being sufficient to express a coherent fraction of a larger device group-related configuration;

the slice selection engine selects one of the multiple device group slices for the network device.

7. The system of claim 1, wherein:
the slice instances datastore includes a device group slice datastore;
the plurality of slice identification engines include a device group slice identification engine coupled to the device group slice datastore;
wherein, in operation:
the device group slice identification engine identifies multiple device group slices that match a device parameter of the network device, each device group slice being sufficient to express a coherent fraction of a larger device group-related configuration;
the slice selection engine merges at least two of the multiple device group slices into a single device group slice for the network device.

8. The system of claim 1, wherein:
the slice instances datastore includes a user role slice datastore;
the plurality of slice identification engines include a user role slice identification engine coupled to the user role slice datastore, wherein, in operation, the user role slice identification engine identifies a user role slice that matches a role of a user of the network device, the user role slice being sufficient to express a coherent fraction of a larger user-related configuration.

9. The system of claim 1, wherein:
the slice instances datastore includes a user role slice datastore;
the plurality of slice identification engines include a user role slice identification engine coupled to the user role slice datastore;
wherein, in operation:
the user role slice identification engine identifies multiple user role slices that match a role of a user of the network device, each user role slice being sufficient to express a coherent fraction of a larger user-related configuration;
the slice selection engine merges at least two of the multiple user role slices into a single user role slice for the network device.

10. The system of claim 1, wherein:
the slice instances datastore includes a user custom slice datastore;
the plurality of slice identification engines include a user custom slice identification engine coupled to the user custom slice datastore, wherein, in operation, the user custom slice identification engine identifies a user custom slice that matches user-customized characteristics for the network device, the user custom slice being sufficient to express a coherent fraction of a larger user-customized configuration.

11. The system of claim 1, further comprising a network management engine configured to provide a set of user attributes to the slice selection engine, wherein, in operation, the slice selection engine identifies at least one coherent subsection in the plurality of coherent subsections of network device configuration settings for the network device using a subset of the user attributes applicable to a user of the network device.

12. The system of claim 1, further comprising a network management engine configured to provide device attributes of the network device to the slice selection engine, wherein, in operation, the slice selection engine identifies at least one coherent subsection in the plurality of coherent subsections of network device configuration settings for the network device using the device attributes.

13. The system of claim 1, further comprising a network management engine configured to provide a set of network attributes to the slice selection engine, wherein, in operation, the slice selection engine identifies at least one coherent subsection in the plurality of coherent subsections of network device configuration settings for the network device using a subset of the network attributes applicable to a network with which the network device will attempt, is attempting, or has attempted to associate.

14. The system of claim 1, further comprising:
a templates datastore configured to store data structures comprising a set of configuration variables;
a slice editing engine, coupled to the templates datastore, wherein, in operation, the slice editing engine generates a slice instance with one or more of the set of configuration variables of one of the data structures instantiated with one or more values;
a slice deployment engine, coupled to the slice editing engine, wherein, in operation, the slice deployment engine provides the slice instance to the slice instances datastore in response to a deployment instruction.

15. The system of claim 1, further comprising:
a device configuration datastore coupled to the slice compilation engine, wherein, in operation, the slice compilation engine provides the combined set of configuration settings for the network device to the device configuration datastore;
a network management engine coupled to the device configuration datastore, wherein, in operation, the network management engine provisions the network device with the combined set of configuration settings for the network device.

* * * * *